United States Patent [19]

Giles et al.

[11] Patent Number: 5,196,484

[45] Date of Patent: Mar. 23, 1993

[54] POLYMERIC ION CONDUCTORS

[75] Inventors: Jeremy R. M. Giles, Farnham, England; Fiona M. Gray, Cupar, Scotland; Colin A. Vincent, Newport-on-Tay, Scotland; James R. MacCallum, St. Andrews, Scotland

[73] Assignee: The Secretary of State for Defence in her Britannic Majesty's Government of the United Kingdom of Great Britain and Northern Ireland, London, England

[21] Appl. No.: 825,195

[22] Filed: Jan. 24, 1992

Related U.S. Application Data

[63] Continuation-in-part of Ser. No. 346,171, May 3, 1989, abandoned.

Foreign Application Priority Data

Oct. 27, 1986 [GB] United Kingdom ............... 8625659

[51] Int. Cl.$^5$ ........................................... C08F 297/04
[52] U.S. Cl. .................................... 525/314; 525/92; 525/130; 525/177
[58] Field of Search ................. 525/92, 130, 177, 314

[56] References Cited

U.S. PATENT DOCUMENTS

| | | | |
|---|---|---|---|
| 3,984,492 | 10/1976 | Imagawa et al. | 525/130 |
| 3,993,627 | 11/1976 | Sekmakas et al. | 525/130 |
| 4,808,255 | 2/1989 | Markevka et al. | 525/130 |

OTHER PUBLICATIONS

Finaz et al "Preparation de copolymers sequences styrolene–oxyde d'ethylene", Bull. Soc. Chim. France (1962) pp. 262–266.

*Primary Examiner*—James J. Seidleck
*Assistant Examiner*—Vasu S. Jagannathan
*Attorney, Agent, or Firm*—Nixon & Vanderhye

[57] ABSTRACT

ABA triblock polymers, the A block being rigid having a transition away from its rigid phase above 70° C., the B block being wholly or partly ion-coordinating, elastomeric or amorphous, the B/A block length ratio being greater than 1. When the B block is complexed with an ionic salt these polymers act as polymeric electrolytes which may be used in cells etc. Preferred polymers are those where HC=CH sites in the polybutadiene segment of a polystyrene-polybutadiene-polystyrene polymer are replaced by $-CH_2CH-X-(CH_2CH_2O)_m-R$, where X is link, R is alkyl. A preferred salt is $LiCF_3SO_3$.

16 Claims, 8 Drawing Sheets

POLYMERIC ION CONDUCTORS

This is a continuation-in-part of application Ser. No. 07/346,171, filed May 3, 1989 now abandoned.

This invention relates to polymeric materials; in addition this invention relates to ionically conducting polymeric materials and their preparation and their use in cells, for example galvanic cells, or other electrical or electrochemical devices, or heterogeneous phase processes, for example, solute separation and extraction.

BACKGROUND OF THE INVENTION

The electrolytes most commonly used in electrolytic cells are liquids in the form of solutions containing ionic species, which allow migration of ions between the electrodes of the cell. The electrolytes used suffer from several disadvantages in that they are often corrosive and toxic and present handling and storage difficulties through spillage or leakage from the cell.

In order to overcome the disadvantages inherent in liquid electrolytes and to obtain superior long-term storage stability there is interest in solid polymeric electrolytes in which ion mobility is achieved through coordination by sites on the polymer chain of electrolyte ions thus promoting electrolyte dissolution and salt dissociation. One polymer which has been examined extensively for this application is poly (ethylene oxide), which is able to form stable complexes with a number of salts. However, the electrical and mechanical properties of such electrolytes require further improvements before application is appropriate, especially for cells required to operate at or near ambient temperature. A major problem with poly (ethylene oxide) electrolytes at temperatures below 60° C. is their high crystallinity and the associated low ion mobility.

Recent advances in the field of polymeric electrolytes have been based on the modification of the polymeric structure in order to increase ion mobility and maintain a high value of such over a wider temperature range. Routes to achieve this have been disclosed in UK Patent Applications 8421193 and 8421194 and in UK Patent Application 8520902, claiming priority from the earlier applications. The routes involve the use of for example, an oxyalkane coordinating unit in the form of an oligomeric sequence such as poly (ethylene glycol) linked by flexible groups at —OH termini to form both linear or cross-linked polymers, so that crystalline, non-conducting phases are essentially eliminated. The physical form of the electrolyte prepared can be controlled by the nature of the constituent parts of the resultant electrolyte and the degree and nature of any cross-linking.

SUMMARY OF THE INVENTION

This invention is concerned with the use of an alternative class of polymer for use as electrolytes whereby the largely amorphous nature of the material, necessary for high ion conduction, is retained yet the mechanical integrity is sufficient to allow application in a useful device. Alternative routes to enhanced mechanical integrity, described in the UK Patent Application 8520902, include the use of filler particles or the introduction of controlled cross-linking.

According to a first aspect of the invention there is provided a novel polymer, comprising an ABA triblock copolymer having a B/A block length ratio greater than 1, in which the A-block material is a polymer selected from the group consisting of glassy polymers having a glass transition temperature above 70° C. and crystalline polymers having a softening or melting temperature above 70° C., and in which the B-block material is a polymer selected from the group consisting of elastomeric and amorphous polymers; wherein said B-block material incorporates attached side chains including oxyalkane sequences containing 2 to 6 carbon atoms between neighbouring oxygen atoms, which side chains serve to render the B-block material at least partially ion-coordinating due to the presence of oxygen in said oxyalkane sequences.

DESCRIPTION OF THE INVENTION

Figure 1:
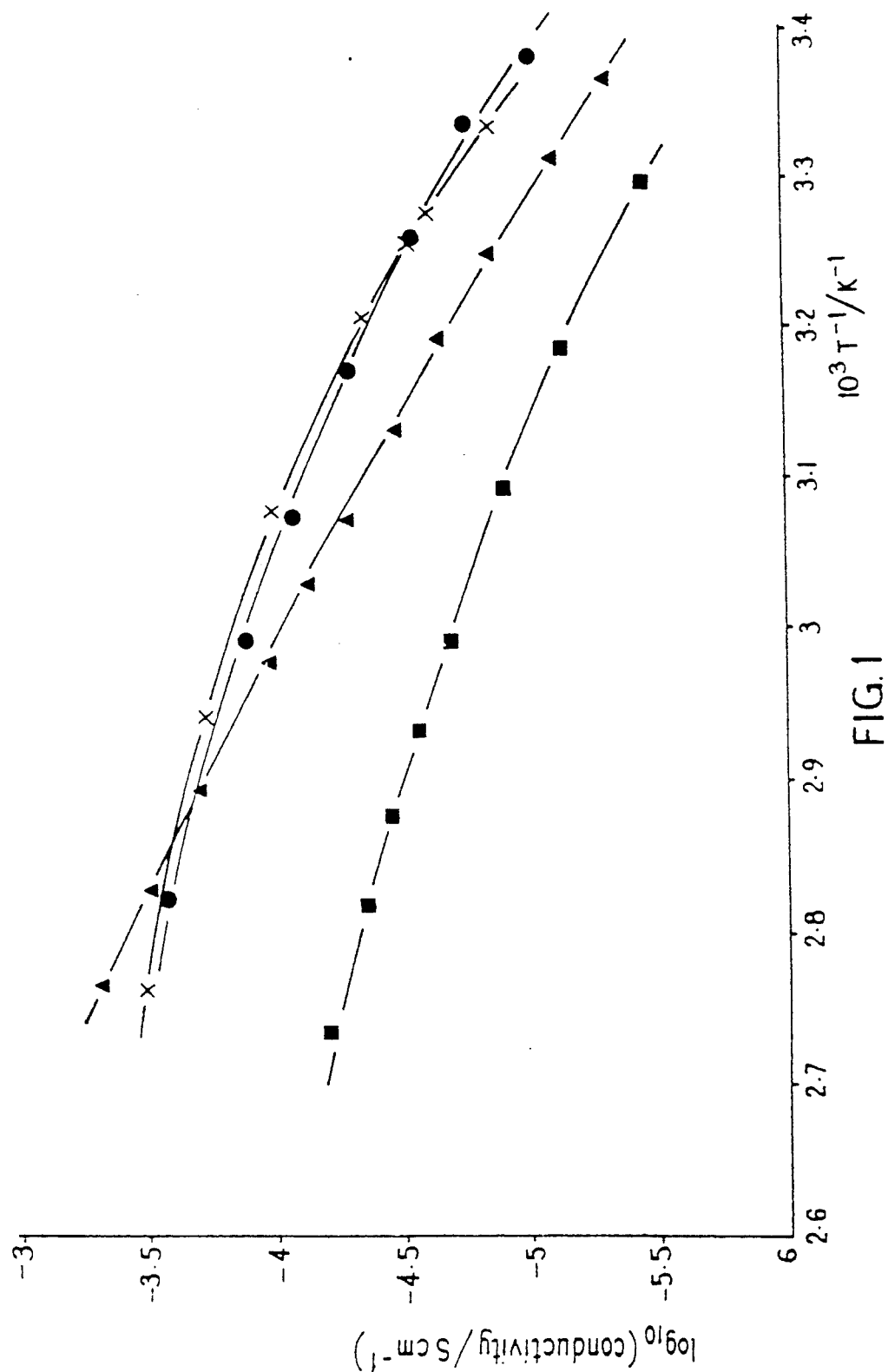
FIG. 1 is a graph showing the temperature dependence of the conductivity of $LiCF_3SO_3$-complexed polystyrene-polybutadiene-polystyrene (PS-PBD-PS) ABA triblock copolymers in which there is 30% hydroxylation of the B component, prepared in accordance with Example 3.

The nature of the A- and B-block materials may be such that phase separation occurs, in which case it is preferred that the A-block forms phases or domains embedded in a matrix of the B-block.

In forming a rigid phase, the A-block polymeric component is either glassy and below its glass transition temperature or predominantly crystalline and below its melting point, when in the intended temperature range of use.

The B-block polymeric component has a glass transition temperature below the intended operating temperature range, and ideally as low as possible, e.g. −20° C. or preferably even lower, e.g. less than −40° C.

The intended temperature range of use, or operating temperature range is generally around ambient, e.g. 20° C. or above, e.g. up to 60° C.

It is preferred that phase separation between the A- and B-blocks occurs, as mentioned above, and this may be encouraged or caused to occur by making a blend of the polymer with a polymer which is compatible with the A-block material and incompatible with the B phase component. By "compatible" herein is included miscible without phase separation.

Phase separation and aggregation of A-blocks occurs as a result of the thermodynamic incompatibility of the component blocks. The rigid domains of A-block form throughout the polymer and may form a relatively rigid macrolattice.

A polymer of this type, having a B-block which is elastomeric, of low glass transition temperature (below the required operating temperature range) and ion-coordinating resulting in a high ion mobility, and A-blocks which form rigid phases or domains which soften or melt at high temperatures e.g. above 70° C., and are embedded and dispersed within the surrounding elastomeric or amorphous phase may have physical properties which can easily be controlled, for example, tensile strength. This aspect is a most important part of the invention: the ability to control the mechanical properties e.g. to obtain a high modulus and low creep characteristic while maintaining a conductivity, obtained from high frequency ac impedance methods, of greater than $10^{-6}$ and preferably greater than $5 \times 10^{-6}$ S.cm$^{-1}$ at 25° C. and simultaneously having a thermoplastic material, which may be soluble in an appropriate solvent.

Having a B phase of low glass transition temperature, polymers of the invention may be used as components of polymeric electrolytes. For these electrolyte-forming polymers of the invention it is preferred that the A-blocks are of equal length. The B/A-block length ratio is controlled, with length (B) greater than length (A), so that the preferred morphology, of near spherical domains of A surrounded by elastomeric B regions, is adopted.

The lengths of the A-blocks and the B/A block length ratio will also influence the occurrence or non-occurrence of phase separation in the polymer.

Suitable A-block lengths and B/A ratios to achieve phase separation will be apparent to those skilled in the art, and examples are described in "Encyclopaedia of Polymer Science and Technology" 15 (1971) (pub John Wiley and Sons) and also in H. G. Elias "Macromolecules" 2nd Edn 1 (Plenum Press).

The size of the A-block phases or domains when phase separation occurs may also be dependent upon the block lengths, and larger block lengths will lead to larger phases or domains. The exact morphology of the A domains will also depend upon physical treatment received by the polymer, for example solution casting, melt forming and any applied stress. For example, stretching or extrusion is likely to elongate or flatten the domains. Blending of the ABA triblock copolymer of the invention with an A-phase compatible material, as mentioned above, may also be used to influence the size and/or shape of the A-block domains. If the added material has a high glass transition temperature and the subsequent blended A phase retains a glass transition temperature above 70° C., then the blending polymer may be used to increase the volume fraction of the rigid A phase, and hence alter the physical properties of the polymer.

It is preferred that the average A-block diameter for the preferred spherical domains is less than 1 μm, preferably less than 1000 Å.

Such domain sizes are generally sufficient to produce a high modulus material without impairing the conducting nature of the B phase.

Materials according to the invention may also be made with anisotropic physical (e.g. the extent of swelling caused by a solvent selective to the B-block), mechanical or ion-conducting properties. This anisotropy may be achieved by modification of the A/B-block size ratio, the forming and manipulation of the material (e.g. solvent casting, melt forming, extrusion), and/or blending of an ABA triblock copolymer with an A-block compatible polymer as described above.

These parameters and methods, individually or in some combination, may be used to generate rigid A phase regions (domains) of various shapes, sizes and relative location, isolated or interconnected in some manner. For example the A domains may adopt shapes which are essentially spheres, lamellae or cylinders (fibres), the non-spherical shapes giving rise to anisotropy.

The general morphological properties of ABA triblock copolymers are described by H. G. Elias (given above) and by D. C. Allport and W. H. Janes in "Block Copolymers" 1974 (Applied Science).

Blends of the ABA triblock polymers of the invention with materials other than or in addition to A-compatible materials may be made. For example, a polymer, oligomer, or low mass substance or combination of such may be blended with the ABA copolymer, being compatible with the B-block component and incompatible with the A phase component.

This possibility may be used to provide physical and material contact with the surroundings of the ABA triblock copolymer when in its application environment. Such an agent added to and blended with the B phase component may act as a plasticiser by lowering the glass transition temperature of the phase. In the formation of an electrolyte material the added agent may also be ion-coordinating; for other applications the added agent may perform another active function.

Alternatively, materials may be blended with the ABA triblock copolymer which are compatible with both the A- and B-blocks of the copolymer. Additionally or alternatively blends using the ABA triblock polymers of this invention may be formed by introduction of substances to both the A- and B-block phases so that three or more starting substances are used in the preparation of the required material.

The quantity of material which is blended with the ABA triblock copolymer may be limited by the necessity to retain desirable physical and/or conduction properties, whether the added material is blended with the A- or B-block.

It has been found in many cases that the blended mixture may contain a 2:1 weight ratio of ABA triblock copolymer and blending agents without detriment to at least the conducting properties of the material, and in the case of a B-compatible blend it is possible to achieve an improvement in the conductivity relative to the unblended ABA triblock copolymer.

The chemical nature of the B- and A-blocks will now be discussed.

The B-blocks are ion-coordinating, and the atom in the B-block responsible for ion-coordination is oxygen in an oxyalkane sequence containing 2 to 6 carbon atoms between neighbouring oxygen atoms. Preferably, the oxyalkane sequence is a polyoxyethylene sequence, i.e.:

$$-(-CH_2CH_2O-)_m-$$

where m is an integer. The ion-coordinating B-block is elastomeric or amorphous. It is therefore desirable to have only short oxyalkane sequences so as to reduce the amount of ambient temperature crystallisation. Alternatively, when m is rather high, B-block plasticisers may be mixed with or blended with the polymer, for example low mass (less than ca 800) polyethylene glycol dimethyl ether. Preferably, the value of m should lie in the range 2-22, for example 7-17.

These oxyalkane sequences may be linked to the B-block chain by chain extender or linking groups or sequences thereof. These are desirably flexible to increase polymer chain mobility.

The links between the oxyalkane sequences and the B-block main chain may be or include ether links (—O—), methylene (—CH$_2$—), ester (—COO—), urethane (—NH—COO—), phosphazine, phosphate ester, siloxane or combinations of these such as —(—CH$_2$—)$_n$ where n is 2-12 ("polymethylene"), —(CH$_2$)$_n$NH-COO— and oxymethylene —OCH$_2$—.

Other suitable linking groups include those described in UK Patent Applications 8421193, 8421194 and 8520902, for example:

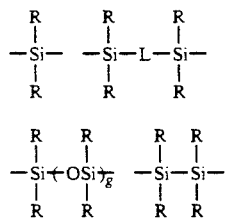

where each R is independently selected from C$_{1-20}$ alkyl; L is —O—, 1,4-phenyl, —(CH$_2$)$_n$— or —(CH$_2$CH$_2$O)$_m$—, m being as defined above, and n is less than 12, and g is an integer between 1 and 100, C(R'R'') or C(R'R'')—OC—(R'R'') where R' and R'' are independently selected from H, C$_{1-20}$ alkyl alkanoyl, or alkoxy, and

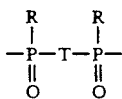

where R is alkoxy, preferably methoxy or ethoxy, and T is —O—, —)(CH$_2$CH$_2$O)$_t$— where t is 1 to 12.

The B-block may also contain covalently attached anions, such as —CF$_2$CF$_2$SO$_3^-$.

It is preferred that the B-block polymer is essentially free from cross-linking or that the cross-link density is low such that the B-block behaves as a linear chain elastomer. In order to generate an oxyalkane copolymer of a sufficiently high molecular weight so as to act as an effective B-block, a low concentration of cross-links may be necessary.

The polyoxyalkane sequences are preferably attached to the B-block main chain by a linking group, and may be terminated by hydrogen or by an alkyl group containing 1-6 carbon atoms so that the side chain has a structure:

$$-X-(CH_2CH_2-O-)_mR$$

where m is as defined above, X is the linking group and R is the alkyl or hydrogen, methyl being preferred. The value of m is preferably chosen so as to give the polyoxyalkane side chain (not counting X) a molecular mass between 100 and 850, for example 750.

The B-block polymer main chain may have a variety of structures. A preferred structure is one derived from a cis-1,4-polybutadiene chain onto which are grafted the preferred polyoxyalkane sequences at some of the unsaturated sites in the chain, using a suitable linking group X as described above to link the polyoxyalkane sequence to the main chain.

Other suitable polymers for the B-block are described in UK Patent Applications 8421193, 8421194 and 8520902. Additional preferred structural types include main chain homo- or co-polymers containing the units shown below:

$$[-OSiR^1R^2-] \quad [-N=POR^3OR^4-]$$

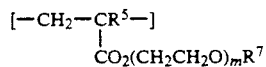

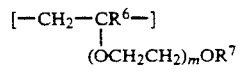

$$-OCR^8CO_2(CH_2CH_2O)_p-$$

where R$^1$ and R$^2$ are independently selected from C$_{1-6}$ alkyl, preferably methyl or ethyl, or —(CH$_2$)-$_d$(OCH$_2$CH$_2$)$_n$—OR$^7$ or —(OCH$_2$CH$_2$)$_n$—OR$^7$ where n is 2-22 and d is 2 or 3, R$^3$ and R$^4$ are independently selected from C$_{1-6}$ alkyl, preferably methyl or ethyl or —(OCH$_2$CH$_2$)$_m$OR$^7$ where m is 2-22, R$^5$-R$^7$ are independently selected from C$_{1-6}$ alkyl and H, and are preferably H or CH$_3$, R$^8$ is —(CH$_2$)$_g$ where g is an integer 2-8 and p is an integer 3-10.

The preferred materials for the A-blocks are described below.

It is desired that the A phase is rigid and softens or melts above 70° C. It is also preferred that there is no appreciable cross-linking in the A-block component so that the triblock copolymer may be soluble in a known solvent. Thus any polymer of high glass transition, and, or alternatively, with a high melting transition and a large crystalline content, that is incompatible with the chosen B-block component, may be used. Suitable polymers for the A-block component include polystyrene, poly(a-methylstyrene), polyurethanes and poly(p-xylylene), and these are preferred.

In preparing a required ABA triblock copolymer a number of synthetic approaches are possible. Either the preferred B-block polymer may be formed and the A-blocks polymerised onto the B-block chain ends, or alternatively the A-blocks may be independently polymerised and then bonded to the chain ends of the preformed B-block. Other methods of preparation will be apparent to those skilled in the art.

Examples of suitable methods for preparing the ABA polymer chain are discussed below.

Where a copolymer is formed which is to act as the B-block, then, for example, any suitably substituted vinyl monomer may be copolymerised, where possible with a vinyl monomer derived from the preferred structural types given, where this is possible, for example:

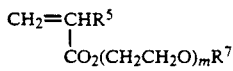

Techniques for this include the "Iniferter" method described by T. Otsu and A. Kurigama, Polymer Journal 1985, 17, 97.

Routes to the synthesis of oxyalkane side-chain containing polysiloxanes are described in British Patent 892,819 and similar methods may be used in this invention or may include methods described by W. Noll in "Chemistry and Technology of Silicones" Academic Press, 1968.

For example these polysiloxanes may be prepared by the controlled hydrolysis of compounds of the type:

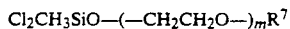

which may be prepared by the reaction of mono-alkoxy, e.g. methoxy terminated poly(ethylene glycol) (PEG) with $CH_3SiCl_3$. Under appropriate conditions the dichloro product is formed, HCl being eliminated.

These polysiloxanes may also be prepared from commercially available poly(hydrogen methyl/dimethyl siloxanes) by a reaction such as:

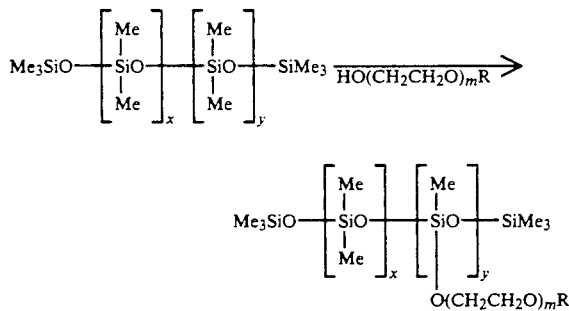

in which Me=methyl and x and y are large integers.

The phosphazine based polymers ($-N=POR^3OR^4-$) may be prepared, first by forming poly(dichlorophosphazine) ($-N=PCl_2-$) and then allowing this to react with the required glycol or sodium salt thereof; here $R^3=R^4$.

In another method, a poly(ethylene glycol) of suitable molecular weight, e.g. 400 is reacted with dichloro- or dibromomethane in basic conditions, e.g. in the presence of KOH as described in GB 8520902 to form an elastomeric polymer of high ionic conductivity when complexed with for example $LiCF_3SO_3$.

If the synthetic conditions are chosen such that the end groups of the polymer are $-CH_2Br$ (e.g. an excess of dibromomethane) then a photochemically-initiated radical polymerisation of the A-block monomer, for example styrene, can be initiated to yield the desired triblock copolymer. Alternatively, if the B-block polymer just described has $-CH_2OH$ end groups then these may be reacted with an alkyl diisocyanate to yield a polymer with isocyanate end group functions; the polymer so formed may be further reacted with cumene hydroperoxide to form peroxy end group functions which can be cleaved to form free radical active centres and thus again initiate A-block formation in the presence of a suitable monomer, for example styrene.

A further ABA triblock copolymer with A-blocks composed of linear polyurethane segments formed from a diisocyanate and low molecular weight glycol, preferably poorly or non salt coordinating, and B-block from the above described polymer generated by reaction of poly (ethylene glycol) Mwt 400 with dibromo- or dichloromethane and having $CH_2OH$ end groups may be prepared as follows. The B-block polymer may be treated with a diisocyanate, aliphatic or aromatic to generate a polymer, isocyanate end-group functionalised. This polymer may now be reacted with further diisocyanate and a low molecular weight glycol to form the A-blocks. Alternatively a preformed polyurethane may be bonded to the B-block polymer, with the end groups of each A- or B-block forming polymer chosen in order to allow urethane linking. A catalyst may be used, and in general techniques and reagents described in the "Encyclopaedia of polymer Science and Technology" Volumes 11 and 15 may be employed.

A further synthetic procedure, preferred and generally applicable, is to modify the B-block sequence of an existing or preprepared ABA triblock copolymer by grafting on oxyalkane sequences as side chains at appropriate positions.

This requires suitable functional groups or unsaturated sites on the B-block chain which may be reacted with functional termini on the oxyalkane sequence either directly or indirectly. The possible chemistry is limited by the need to restrict as far as possible any cross-linking between the B-blocks.

A preferred starting point is an ABA triblock copolymer having a B-block which is poly(cis-1,4-butadiene). Here there is the possibility of an addition reaction leading to grafting at one or both carbon atoms of each carbon—carbon double bond. The A-block component may be one of the preferred polymers referred to above, so that this starting point is for example a polystyrene-poly(cis-1,4-butadiene)-polystyrene ("PS-PBD-PS") ABA triblock polymer. These starting materials are either commercially available or may be prepared by known methods.

A method grafting oxyalkane sequences onto such a B-block involves epoxidation of C=C groups, followed by reduction to generate $-OH$ functions for use in the bonding of the oxyalkanes, appropriately terminally functionalised. Suitable reagents for the first two steps are m-chloroperbenzoic acid and $LiAlH_4$, respectively. Their use leads to a minimum number of unwanted side reactions. By controlling the epoxidation step, e.g. via stoichiometry, introduction of the required degree of $-OH$ functionalisation may be achieved.

The method of epoxidation of the diene is preferred as this reduces the possibility of cross-linking.

Having introduced these $-OH$ groups into the B group, grafting in the polyoxyalkane sequence is facilitated. Preferred methods are to form an ether link via for example formation of a tosyl-terminated polyoxyalkane sequence and reaction of this with the $-OH$ groups, or formation of urethane links, by formation of an isocyanate-terminated polyoxyalkane sequence and reaction of this with the $-OH$ groups.

Other types of link are also suitable in these polymers, for example ester links formed by reaction of a carboxylic acid terminated polyoxyalkane sequence with the $-OH$ group of the B-block of the polymer.

A particularly preferred ABA triblock polymer of the invention which may advantageously be prepared from an existing PS-PBD-PS polymer using the above method therefore has a B-block in which random replacement of a proportion of the unsaturated HC=CH sites is carried out in the PBD chain, these being replaced by:

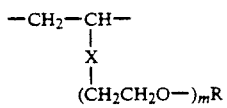

sites, where X, m and R are as defined above. Conveniently, the linking group X may be an ether-type linkage (i.e. X is an oxygen atom), or a urethane-type linkage (e.g. X is —OCO.NH(CH$_2$)$_n$NHCOO n is 2–12), or a dicarboxylate linkage (e.g. X is —OCO—(CH$_2$)$_p$—COO— where p is 1–12, preferably 2). R is preferably methyl.

The proportion of C=C sites in the PBD chain which are replaced in this way will be related to the degree of —OH functionalisation that is introduced if the epoxidation/reduction process above is followed. Typically, but not exclusively, a preferred proportion of replacement is 20–60%.

The structure of poly(cis-1,4-butadiene) is shown ideally below:

where N is a large number. The polymeric chain has at least 80–85% of the double bonds in the cis configuration.

The B-block of the particularly preferred polymers of the invention will therefore contain such repeating units, and may also contain a proportion at least of randomly distributed units having structures selected from the following:

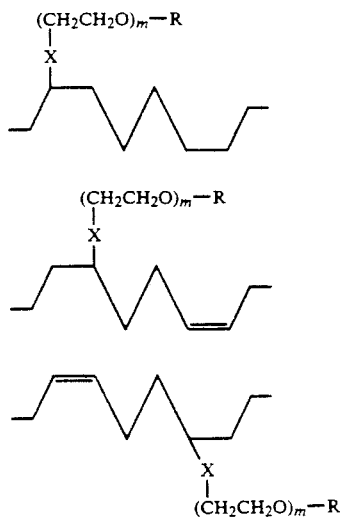

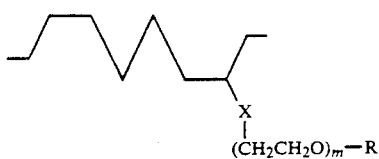

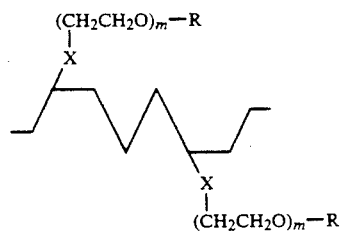

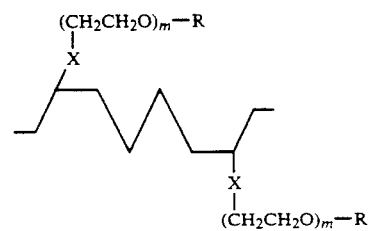

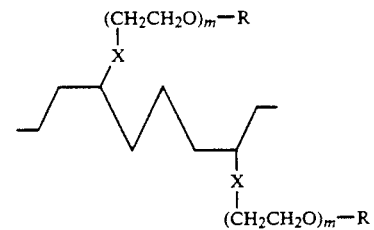

where single and double bonds are shown conventionally by line formulae and X, m and R are as defined above.

For a polymer as described above having polyoxyalkane side chains grafted onto the PBD B-block the preferred average molar masses in the starting material for the A-block polystyrene segments are about 10,000 to 40,000 each and for the B-block about 40,000 up to about 150,000, typically about 100,000. These molar masses are found to give the desired structure of the polymer as discussed above.

For blending with the polymer mentioned above, a suitable A-compatible blending material is polystyrene, when the A-block is also polystyrene, and may have a similar molar mass to that of the A-block, for example 20,000. A suitable B-compatible blending material is polyethylene glycol dimethyl ether (of average molar mass ca 400), poly(ethylene glycol) or other low molecular mass (e.g. ca 400) material when for example the B-block is methoxy poly(ethylene glycol) grafted polybutadiene.

The polymer may also be blended with high molar mass poly(ethylene oxide), for example of molar mass $1-6 \times 10^6$.

When it is desired to blend both A-block and B-block compatible material with this preferred polymer then the A- and B-block compatible materials referred to above may be used.

When the starting point for the epoxidation and —OH functionalisation process described above is an ABA triblock polymer having a PBD B-block and A-blocks which are the preferred A-block polymers mentioned above, in particular polystyrene, the epoxidised or —OH functionalised intermediates may also be novel and useful materials.

The ABA triblock copolymers of the invention may be used to form a polymeric electrolyte, and according to a further aspect of the invention there is provided a polymeric electrolyte comprising an ABA triblock copolymer as described above and having an ionic salt complexed with the B-block. This electrolyte is therefore a solid solution electrolyte.

For use in electrolytes, polymers in which phase separation of the A-blocks, as described above, has occurred, are preferred, for example those based upon a PS-PBD-PS ABA triblock polymer as described above.

The ionic salt complexed with the B-block of the ABA triblock copolymer to form a solid solution electrolyte is preferably the salt of an alkali metal or an alkaline earth metal, including lithium, sodium, magnesium, potassium or calcium salts. Alternatively an ammonium salt may be used, or an alkyl ammonium salt containing the cation $R_4N^+$ where the R groups are selected from alkyl, optionally substituted alkyl or H. The anion of the salt may be any commonly used anion, but is preferably a relatively large anion of a strong acid, for example perchlorate $ClO_4^-$, trifluoromethanesulphonate $CF_3SO_3^-$, $BF_4^-$, $PF_6^-$, $SCN^-$, $CF_3CO_2^-$, $CH_3CO_2^-$, $I^-$ or $B(C_6H_5)^-$ or $I_3^-$. $LiCF_3SO_3$ is a preferred salt.

Alternatively if the B-block contains covalently attached anions, e.g. $-CF_2CF_2SO_3^-$ with associated ionically-bound cations e.g. $Li^+$ ions, an added salt may be unnecessary, or a salt may be added.

The polymeric electrolyte of this aspect of the invention may be made in a number of ways, all intended to disperse and dissolve the salt in the ABA triblock copolymer.

Known methods may be used, for example mixing together the polymer and salt and then melting them together to form a complex and then extruding the mixture into a thin film.

Another method involves milling the salt and the polymer together at a low temperature, followed by forming the electrolyte into a film with heat and pressure.

A third method involves dissolving the salt and the polymer together in a suitable solvent at an appropriate concentration, and forming the mixture into a film by solvent evaporation. Suitable solvents include for example THF. Some solvents such as nitromethane encourage phase separation between the A- and B-blocks, and the use of such solvents is preferred as this has in some cases been found to lead to improved electrolyte performance. Mixtures of solvents may also be used.

In a further method, the polymer may be immersed in a solution of the salt in a suitable solvent which does not dissolve the polymer, e.g. an alcohol such as methanol. The salt thereby partitions between the solution and the B-block of the polymer, and is incorporated into the polymer.

In the salt-complexed polymer, it is preferred that the oxygen to cation ratio in the electrolyte should be between 4:1 and 50:1.

The polymeric electrolyte according to the invention is preferably a solid, in the sense of resisting creep during cell assembly.

The electrolytes described herein may be used in any application where a solid solution electrolyte is possible and desired. One such application is in a galvanic or photogalvanic cell comprising an anode, a cathode and an electrolyte sandwiched between the said electrodes, in which the electrolyte comprises a polymeric electrolyte according to the invention described herein. Batteries may also be formed comprising a plurality of such cells. The galvanic cells and batteries of such may be manufactured in known ways. They may be either primary or secondary (rechargeable) cells or batteries for a variety of applications for example, electric vehicles, back-up power sources for use in for example computers, heart pace-makers and integrated power sources for electronic circuitry. The batteries may be connected in either series or parallel or a combination of such depending on whether maximum voltage or current or some compromise is required as output.

The thickness of the individual cells can be made extremely small while maintaining a high contact surface area, and it is thus possible to incorporate many cells, for example 1000 or more, in a compact battery structure. For high energy density cells it is preferred that the anode is lithium metal or an alloy, for example lithium-aluminium or lithium-silicon so that the anode is reversible to the $Li/Li^+$ couple. Here it is preferred that the ABA triblock copolymer electrolyte is complexed with a lithium salt and that the cathode is a lithium ion intercalation material, such as $TiS_2$, although an electrolyte and possibly conducting particles such as carbon black may be mixed with the cathode material. Thus the anode and cathode may be conventional as may the encapsulation of the cell and/or its assembly within the battery. For example, the cell may be formed using the techniques described in U.S. Pat. No. 4,303,748.

The polymers of the invention may also be used in a heterogeneous phase process, for example, solute separation and extraction, wherein a salt complexed with the B-phase should not be required. The solute to be concentrated in the stationary phase formed entirely or in part by a polymer of this invention may be for example an ionic salt or an organic material or an inorganic material or combination of such, possibly covalently bound together. The solute in solution could for example be passed through a column containing such a polymer. The polymer could be rendered less soluble in such an application by cross-linking in the A-block.

An analogous use for the polymers of this invention is where the polymer would act as a membrane between different, usually liquid and solid phases forming a semipermeable barrier allowing physical contact and transfer of material between said phases.

The invention will now be illustrated by way of example only with reference to the accompanying FIGS. 1–8 which show the temperature dependence of the conductivity of polymeric electrolytes of the invention.

DESCRIPTION OF THE PREFERRED EMBODIMENTS

Example 1

Synthesis of ABA Triblock Copolymer Polystyrene-Polybutadiene-Polystyrene with B-phase Side Chain Grafted Methoxy Polyethylene Glycol The electrolyte forming polymer was derived from a starting ABA thermoplastic elastomer triblock copolymer of polystyrene A-block and cis-1,4-polybutadiene B-block containing ca 35% by weight polystyrene (I).

This polymer (I) had an average molecular mass by gel permeation chromatography of ca 150,000.

The first stage of the synthesis was the epoxidation of a fraction of the polybutadiene carbon-carbon double bonds by reaction with m-chloroperbenzoic acid followed by reduction of the product with lithium aluminium hydride to generate hydroxyl-functional groupings:

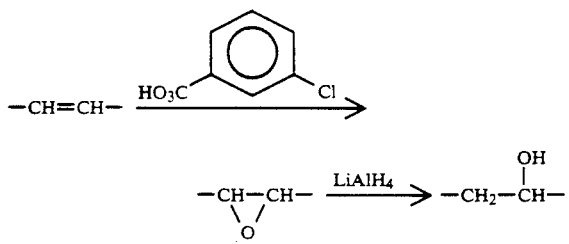

A. Reaction of 30% of Available C=C Groups

Typically, 5 g of the starting ABA triblock copolymer (I) was dissolved in 70 cm³ distilled and dried dichloromethane and 4 g m-chloroperbenzoic acid in dichloromethane (60 cm³) added dropwise. The reaction solution was refluxed (4.5 hours) and then stirred at room temperature (ca 35 hours). The resultant solution was decanted from the colourless precipitate of benzoic acid that had formed. Product polymer (II) was isolated by pouring the reaction solution into excess methanol. After precipitation (II) was washed several times with methanol and dried under vacuum.

The epoxide containing product (II) thus formed, was reduced with LiAlH₄ in THF solution. 0.08 g LiAlH₄ was mixed with 40 cm³ of purified THF followed by the addition of (II) (0.22 g) in THF solution. After a 2.5 hour reflux, distilled water was added to react with excess hydride present and subsequently THF removed under vacuum. Water (40 cm³), hydrochloric acid (2 mol⁻³, 10 cm³) to dissolve inorganic matter, and CH₂Cl₂ (80 cm³) were added to the product mixture. After stirring for ca 30 minutes to allow polymer dissolution the aqueous layer was discarded and the organic fraction washed with water several times. The polymeric product (III) was precipitated by pouring into methanol, dried and redissolved in CH₂Cl₂. The solution formed was dried using molecular sieves and the polymer isolated by precipitation into methanol. The product (III) was dried under vacuum at 60° C.

III had 30% of all aliphatic B-block double bonds hydroxylated, as determined by ¹H nmr.

B. Reaction of 52% of Available C=C Groups

The method was similar to that above; 5 g of the starting polymer (I) was reacted with 8 g m-chloroperbenzoic acid in dichloromethane. ¹H nmr showed 52% epoxidation in the product isolated.

The reduction of the polymeric epoxide was similar to A above except that the isolated hydroxylated product was soluble in methanol preventing the use of a reprecipitation purification route. Instead the CH₂Cl₂ product solution obtained was evaporated down and residual water present poured off. The polymer was redissolved in CH₂Cl₂, dried over molecular sieves, and the solvent removed. Product (III), 52% hydroxylated was finally dried under vacuum at 50° C.

C. Functionalisation of Methoxy Poly(ethylene glycol) for Grafting to the Hydroxylated ABA Triblock Copolymer (III)

Two routes of functionalisation were employed so that either an ether or urethane linkage could eventually be used to generate the required electrolyte forming polymer. The methods allow easy variation of the eventual side chain length by simple choice of the poly(ethylene glycol) mass range to be used.

a. Formation of a Tosylate

The method was that of Harris et al., J.Polym.SCI., Polym.Chem.Ed., 1984, 22, 341.

3 g of tosyl chloride in CH₂Cl₂ (20 cm³) was added dropwise to dried methoxy poly(ethylene glycol) of average molar mass 350 (5 g) and triethylamine (2 g) in CH₂Cl₂ (25 cm³) at 0° C. After the solution had been stirred for 3 hours, a precipitate of triethylamine hydrochloride could be removed when the solution had been added to diethyl ether. Removal of solvent from the product solution and addition again to diethyl ether allowed separation of residual hydrochloride salt. The final product was labelled (IV).

In a similar manner, methoxy poly(ethylene glycol) of average molar mass 750 was tosylate functionalised, the product was labelled (XI).

b. Formation of a Urethane

The reaction used was:

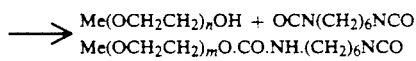

Methoxy poly(ethylene glycol)s of average molar mass ranges of 550 and 750 were used.

Hexamethylene diisocyanate (11 cm³, 5 molar excess) and two drops of dibutyl tin dilaurate were dissolved in a small quantity of THF stirred under nitrogen and methoxy poly(ethylene glycol) (550, 7 g) in THF solution added dropwise over a period of 5 hours. The reaction solution was stirred for ca 15 hours, solvent removed and the liquid obtained added dropwise to dry diethyl ether maintained at −5° to −10° C. Decantation of the ether left the required product, (V). The precipitation procedure was repeated 3 times.

For the reaction of methoxy poly(ethylene glycol) of average molar mass 750, a 9 g sample was added to 11 cm³ of hexamethylene diisocyanate in the presence of dibutyl tin dilaurate. The procedure used was that given above, and the product (VI) isolated in a similar way.

D. Graft Copolymer Formed between (III) with 30% Hydroxylation and (IV)

The reaction scheme used is summarised by the equations below:

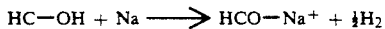

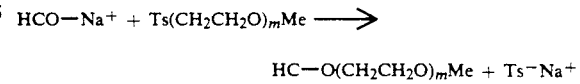

$$Ts = Me-\langle O \rangle-SO_3$$

Excess sodium metal was added to a stirred THF solution of (III) with 30% hydroxylation. The solution was decanted into a second vessel and excess (IV) in THF solution added. The reaction solution was stirred for 2 days at room temperature, after which the solvent and any remaining (IV) were removed. The polymeric product (VII) was washed with methanol and dried under vacuum. Oxyethylene grafting was confirmed by nmr.

E. Graft Copolymer (XII) Formed between (III) with 52% Hydroxylation and (XI)

In an analogous manner to the synthesis described in D above, (III) with 52% hydroxylation, in stirred THF solution, was reacted with sodium metal to generate the salt, which after separation was allowed to react with the tosylate (XI). The product isolated was labelled (XII).

Example 2

Graft Copolymers Formed from the Reaction of (III) with (V) or (VI)

The method involves a condensation reaction to generate a urethane linkage at the grafting site. A dibutyl tin dilaurate catalyst was used.

A. 2.5 g of (V) in THF solution was added to (III) 30% hydroxylated (0.2 g) in THF followed by 2 drops of dibutyl tin dilaurate catalyst. The resulting solution was refluxed for ca 16 hours, after which the solvent was evaporated off and the solid remaining washed with methanol several times in order to remove residual (V). The polymeric product, (VIII) was dried under vacuum at 50° C. and contained a ca 52% wt grafted oxyethylene component.

B. 3 g of (VI) in THF solution was added to (III) 30% hydroxylated (0.25 g) in the presence of dibutyl tin dilaurate in THF solution. Following a ca 16 hour reflux the solvent was removed and the crude product remaining washed with cold methanol then redissolved in $CH_2Cl_2$. The product was reprecipitated by pouring into cold methanol and dried under vacuum at 60° C. The final product, (IX) had a 64% wt oxyethylene component, confirmed by nmr.

The reactions may be summarised by the equation:

$$HC-OH + OCN(CH_2)_6NH.CO.O(CH_2CH_2O)_mMe \longrightarrow$$

$$HC-O-CO.NH.(CH_2)_6NH.CO.O.(CH_2CH_2O)_mMe$$

C. A Graft Copolymer Formed between (III) with 52% Hydroxylation and (V)

3 g of (V) was dissolved in THF and added to a solution of 0.25 g (III) (52% hydroxylated) and 2 drops of dibutyl tin dilaurate in THF. The resulting solution was refluxed for 16 hours. After evaporation of the solvent the remainder was washed repeatedly with cold (0° C.) methanol to remove excess (V). Incorporation of the polyglycol in the product formed, (X), was confirmed by nmr, showing a 63% wt oxyethylene component.

D. In an analogous manner a graft of (III) 52% hydroxylated with (VI) was prepared. The product was labelled (XIII).

Example 3

Electrolytes from Polymer (IX)

A film of (IX) having B-phase complexed with $LiCF_3SO_3$ (to give B-phase oxygen-for-lithium-binding to lithium molar ratio of either 50, 30, 16 or 7) was prepared from a THF solution of (IX) and the salt at room temperature. The solvent was evaporated under vacuum to leave a solid electrolyte. This was heated to 110°–120° C. in vacuum for 4–5 hours. After cooling the sample to room temperature further manipulations were carried out under argon-atmosphere glovebox conditions. The material was mounted between electrode anvils and pressed at room temperature from a 5 mm diameter pellet to a 13 mm diameter film. Finally, the films were heated to 110°–120° C. for 1 hour, without the application of pressure, then slowly cooled (ca 1° C. $min^{-1}$) to room temperature. The electrodes-electrolyte film assembly was transferred to a variable-temperature conductivity cell for ac impedance analysis. The electrodes were steel and ion-blocking. Films examined were typically 100–300 μm in thickness and their response characteristics were recorded over a frequency range of 1 MHz to 1 Hz, at a series of temperatures. $Log_{10}$ (conductivity/S $cm^{-1}$) against reciprocal temperature ($K^{-1}$) is plotted in FIG. 1.

The film with an O/Li ratio of 16 had a conductivity at 25° C. of $1 \times 10^{-5}$ S $cm^{-1}$, while that with O/Li=7 exhibited a value of $5.8 \times 10^{-6}$ S $cm^{-1}$ at 25° C., and had a B-phase glass transition temperature of $-37°$ C., recorded with a 20° C. $min^{-1}$ heating rate.

Example 4

Electrolytes from Polymer (VIII)

The polymer was milled at close to $-196°$ C. and then milled under similar conditions with an appropriate quantity of $LiCF_3SO_3$ added so that a homogeneous material was generated. This is an alternative first step to the solvent casting procedure used in Example 3. Subsequent steps of heating, pressing at room temperature, and heating followed by a slow cool to room temperature were as described in Example 3, as was the electrolyte film ac impedance examination. Films having O/Li ratios of 30, 16 and 7 were investigated and the dependence of their conductivities is described in FIG. 2. With O/Li=16, the electrolyte had a conductivity at room temperature of $2.7 \times 10^{-6}$ S $cm^{-1}$.

An electrolyte was prepared by a solvent casting route, similar to that of Example 3, except that the solvent used for (VIII) and $LiCF_3SO_3$ (to give O/Li=7) was nitromethane with ca 5% v/v THF. The solution was allowed to evaporate under a flow of dried nitrogen to leave a film coating one of a pair of steel electrodes. Residual solvent was removed at 130° C. for 24 hours. The temperature dependence of conductivity for the electrolyte is recorded in FIG. 3 and the values are approximately one order of magnitude greater than those of the equivalent electrolyte prepared by the milling procedure described above, demonstrating the importance of electrolyte or polymer forming route on the properties of the final material. At 25° C. (VIII) with O/Li=7 ($LiCF_3SO_3$) showed a conductivity of $2.0 \times 10^{-5}$ S $cm^{-1}$.

Example 5

Electrolytes from (X)

An electrolyte was prepared in a similar manner to those described in Example 4, by solid-state milling and pressing. A plot of $\log_{10}$(conductivity/S cm$^{-1}$) versus reciprocal temperature (K$^{-1}$) for an electrolyte with O/Li=16 is given in FIG. 4. At 25° C. the conductivity was $4.0 \times 10^{-6}$ S cm$^{-1}$.

Example 6

Electrolytes from (XII)

Electrolyte films were prepared in a similar way to those of Example 3. A film of (XII) containing LiCF$_3$SO$_3$ to a concentration resulting in a B-phase O/Li molar ratio of 16 had a conductivity at 25° C. of $1.0 \times 10^{-5}$ S cm$^{-1}$.

Example 7

Figure 5:
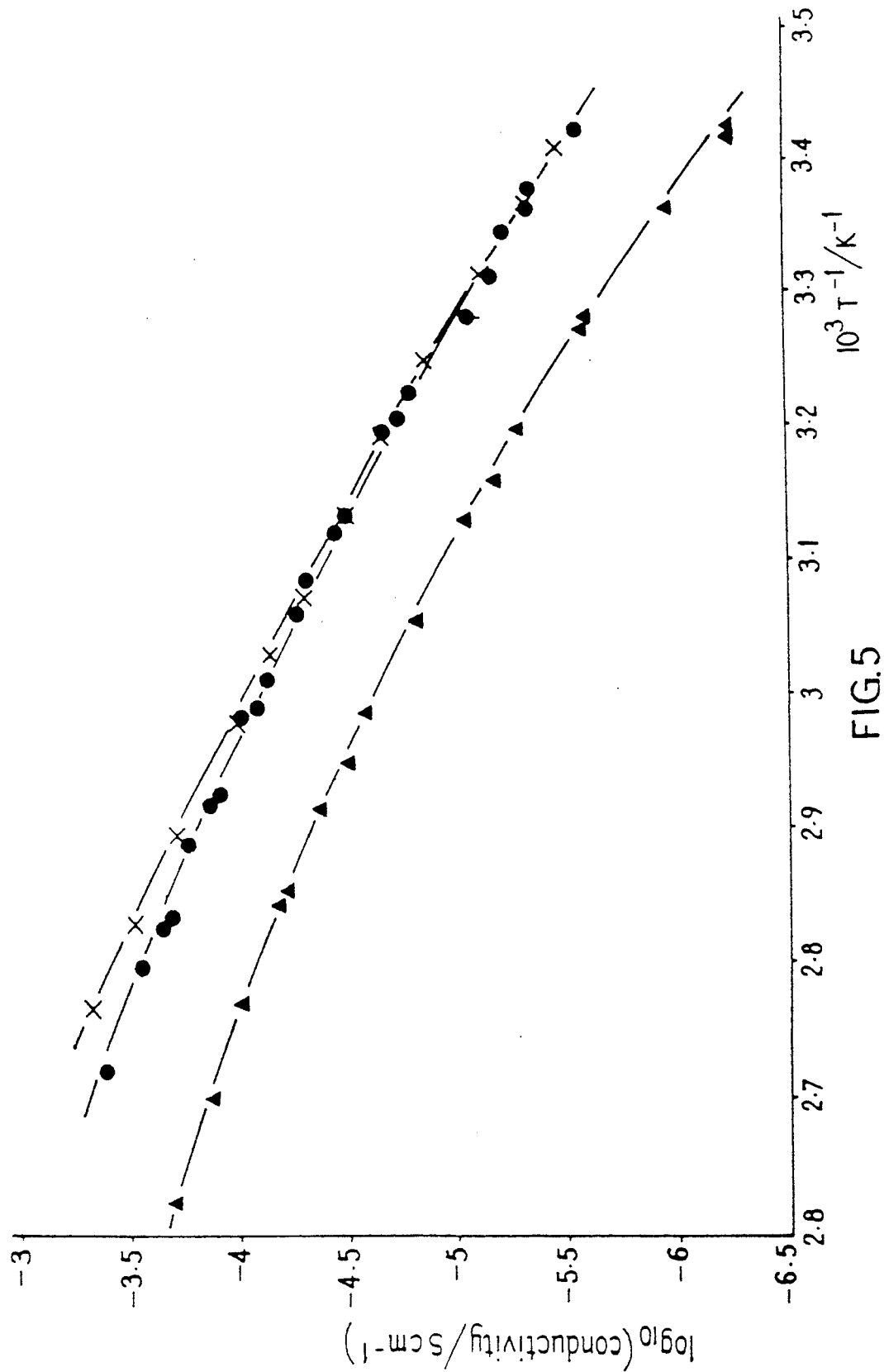
FIG. 5 is a graph showing the temperature dependence of the conductivity of $LiCF_3SO_3$-complexed ABA triblock polymers blended with A- or B-block compatible matereials in accordance with Example 7.
Figure 6:
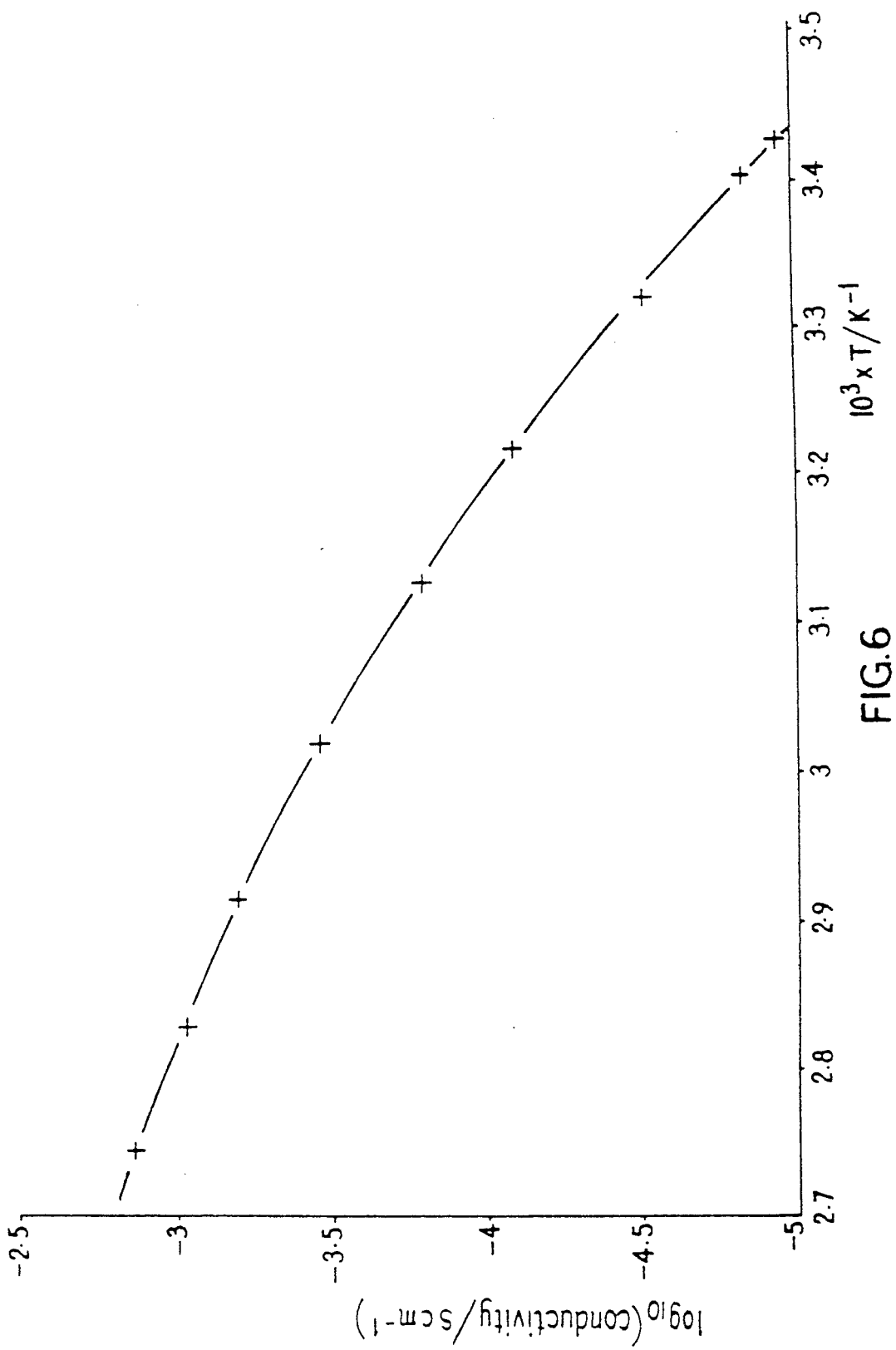
FIG. 6 is a graph showing the temperature dependence of the conductivity of $LiCF_3SO_3$-complexed ABA triblock polymers prepared in accordance with Example 10 using a glycol of $M_w=550$.
Figure 7:
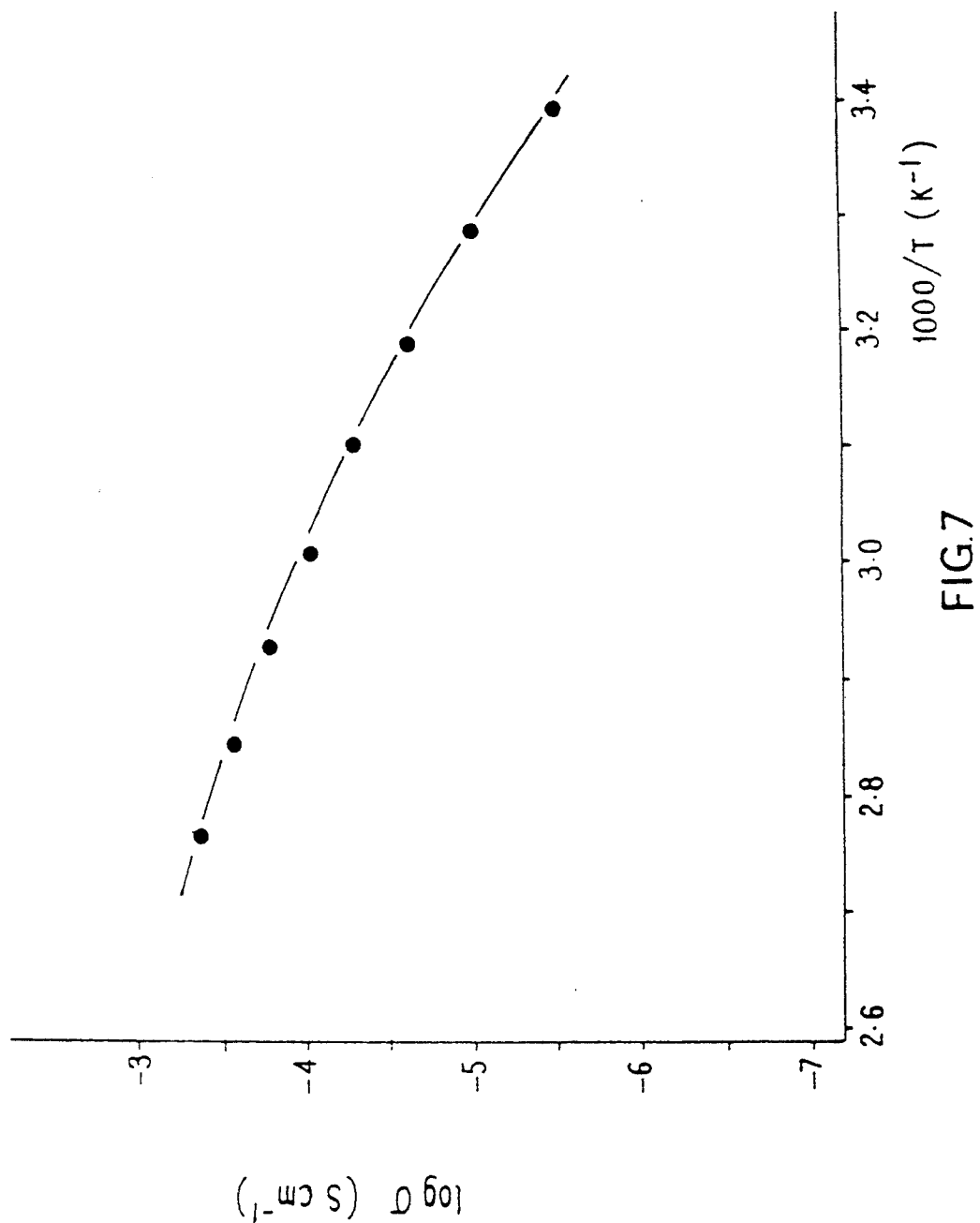
FIG. 7 is a graph showing the temperature dependence of the conductivity of $LiCF_3SO_3$-complexed ABA triblock polymers prepared in accordance with Example 10 using a glycol of $M_w=750$.

Blending of ABA Triblock Polymer (a) with A-block compatible material 0.028 g of polystyrene (M$_n$=20,200, M$_w$=20,800) was dissolved with 0.1 g of (IX) and LiCF$_3$SO$_3$ (to give O/Li=7) in a small volume of dichloromethane and the solvent removed by evaporation. For the generation of electrolyte films the material was treated in a similar manner to (IX) in Example 3 and the conductivity was measured as a function of temperature (FIG. 5). The material had an oxyethylene component of 50% wt. At 25° C. a conductivity of $6.7 \times 10^{-6}$ S cm$^{-1}$ was recorded.

0.052 g of polystyrene (M$_n$=20,200, M$_w$=20,800) was dissolved in dichloromethane with 0.1 g of (IX) and sufficient LiCF$_3$SO$_3$ to give O/Li=7. The film formed by evaporation was treated in a similar way to the example above with a 50% wt oxyethylene component. At 25° C. a conductivity of $1.4 \times 10^{-6}$ S cm$^{-1}$ was recorded (FIG. 5) and the material had an oxyethylene content of 42% wt.

(b) with B-block compatible material 0.1 g of (IX), 0.05 g of polyethylene glycol dimethyl ether of average molar mass 350 and sufficient LiCF$_3$SO$_3$ (to give O/Li=7) in THF solution was evaporated at room temperature to form a solid electrolyte film. This was then heated under vacuum for 4 hours at 120° C., cooled to room temperature, pressed between cell electrodes as described in Example 3, and the conductivity recorded. At 25° C. the electrolyte had a conductivity of $4.1 \times 10^{-5}$ S cm$^{-1}$.

Example 8

Use of Polymer in a Heterogeneous Phase Process 0.30 g of (VIII) was immersed in a solution of 0.070 g LiCF$_3$SO$_3$ in methyl alcohol (3 cm$^3$) for ca 30 minutes to allow partition of the salt between the B-block and the methyl alcohol phase. The (VIII) was removed from the methanol and dried under vacuum. Atomic absorption spectroscopy showed the ca 80% of the total salt content initially in the methanol phase has partitioned into the polymer.

The morphology of the above polymers, of domains of the polystyrene A phase dispersed in a matrix of the polybutadiene-derived B phase was confirmed by electron microscopy.

Example 9

Graft Copolymer Formed between III with 30% Hydroxylation and Methoxy Poly(ethylene glycol) carboxylic Acid Functionalised A. Functionalisation of methoxy poly(ethylene glycol) by reaction with succinic anhydride The general procedure is described by Zalipsky et al. (European Polymer Journal, 1983, 19, 1177). Overall:

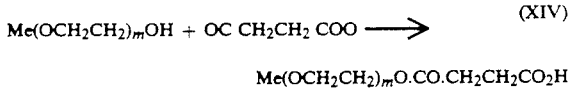

Me(OCH$_2$CH$_2$)$_m$O.CO.CH$_2$CH$_2$CO$_2$H

Method 1

7 g of dry methoxy poly(ethylene glycol) (750) and a 4 fold molar excess of succinic anhydride (3.72 g) were dissolved in a small amount of toluene and stirred at 150° C. for 5 hours. On cooling, the functionalised product, (XIV) with glycol mass 750, could be precipitated out of solution by addition to cooled diethyl ether. This purification step was repeated several times.

Method 2

A. Catalysed Procedure

To 7 g of dry methoxy poly(ethylene glycol) (750) in THF was added 1 g of succinic anhydride, 1.3 cm$^3$ triethylamine and 1.14 g 4-dimethylaminopyridine (DMAP) and the solution stirred overnight at room temperature. The solvent was removed under reduced pressure, carbon tetrachloride added, the solution formed filtered and subsequently the product was precipitated by pouring the solution into cooled diethyl ether. The nature of the product and its association with DMAP was confirmed by ir spectroscopy (Zalipsky et al).

B. Graft Copolymer (XV) Formed between (III) with 30% Hydroxylation and (XIV) with Glycol Mass 550

0.1 g of (III) with 30% hydroxylation and 0.4 g of (XIV) with glycol mass 550 were dissolved in dichloromethane. To this was added 0.1 g dicyclohexylcarbodiimide (DCC) and a catalytic quantity of 4-pyrrolidinopyridine. The solution was refluxed for 2 hours. After cooling, precipitated dicyclohexylurea (DCU) was filtered off and the residue dried and dissolved in acetone. Further DCU residues were separated from the solution. The graft copolymer product was purified further by precipitation from THF solution into cooled methanol. The product, (XV), was characterised by ir and nmr spectroscopies.

Example 10

Electrolytes from (XV), and Analogue (XVI) with Glycol Mass 750, both Prepared by the Route Given in Example 9

(XVI), with 30% grafting of methoxy poly(ethylene glycol) 750 through a succinate linkage prepared by the method of Example 9, was dissolved in a 90% v/v nitromethane-THF mixture and LiCF$_3$SO$_3$ added to give a B-phase oxygen-to-lithium ion molar ratio of 7. A film was cast from the solution onto the lower of a pair of horizontal parallel steel electrodes. After the majority of the solvent had evaporated the film was heated for 10 hours at 100° C. A further heating period was occasionally applied. Conductivity was recorded for film ca 250 μm in thickness. Log$_{10}$(conductivity/S cm$^{-1}$) versus reciprocal temperature (K$_{-1}$) is plotted in FIG. 6. A similar result was obtained for an electrolyte prepared by a similar route from (XV) with an oxygen-to-lithium ion molar ratio of 7. Data is given in FIG. 7.

Example 11

Blend Formed between High Molar Mass Poly(ethylene oxide) and (VIII) in the Presence of LiCF$_3$SO$_3$ to Form an Electrolyte Poly(ethylene oxide) (mass 4×10$^6$), graft copolymer (VIII) and LiCF$_3$SO$_3$ (to give an oxygen-to-lithium ion molar ratio of 10) were ground together in a ball mill at liquid nitrogen temperatures. Mixtures were prepared containing 25 or 50% wt poly(ethylene oxide), based on total polymer content.

The blend so formed was hot pressed to give an electrolyte film by heating the material between steel electrode plates at 373 K. using slight pressure. The temperature dependence of conductivity for the two samples is given in FIG. 8.

Although the invention has been particularly described with reference to examples in which the oxyalkane sequences in the side chains attached to the B-block material are polyoxyethylene sequences, it will be well understood by persons of ordinary skill in the art that the synthetic steps outlined in the examples are equally applicable to higher oxyalkanes as defined by the claims which follow.

Figure 2:
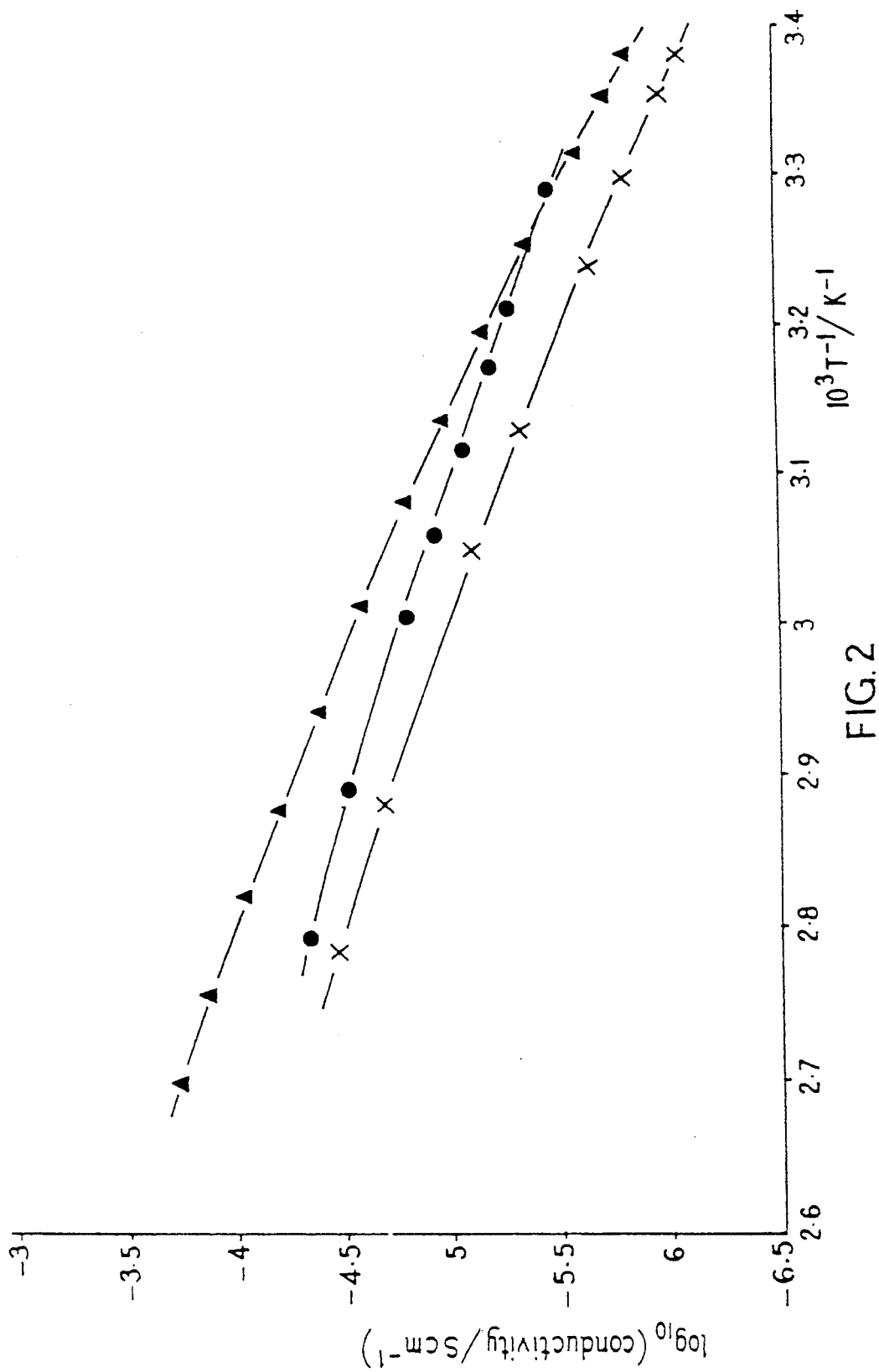
FIG. 2 is a graph showing the temperature dependence of the conductivity of $LiCF_3SO_3$-complexed ABA triblock polymers prepared in accordance with Example 4 using a powder milling technique.
Figure 3:
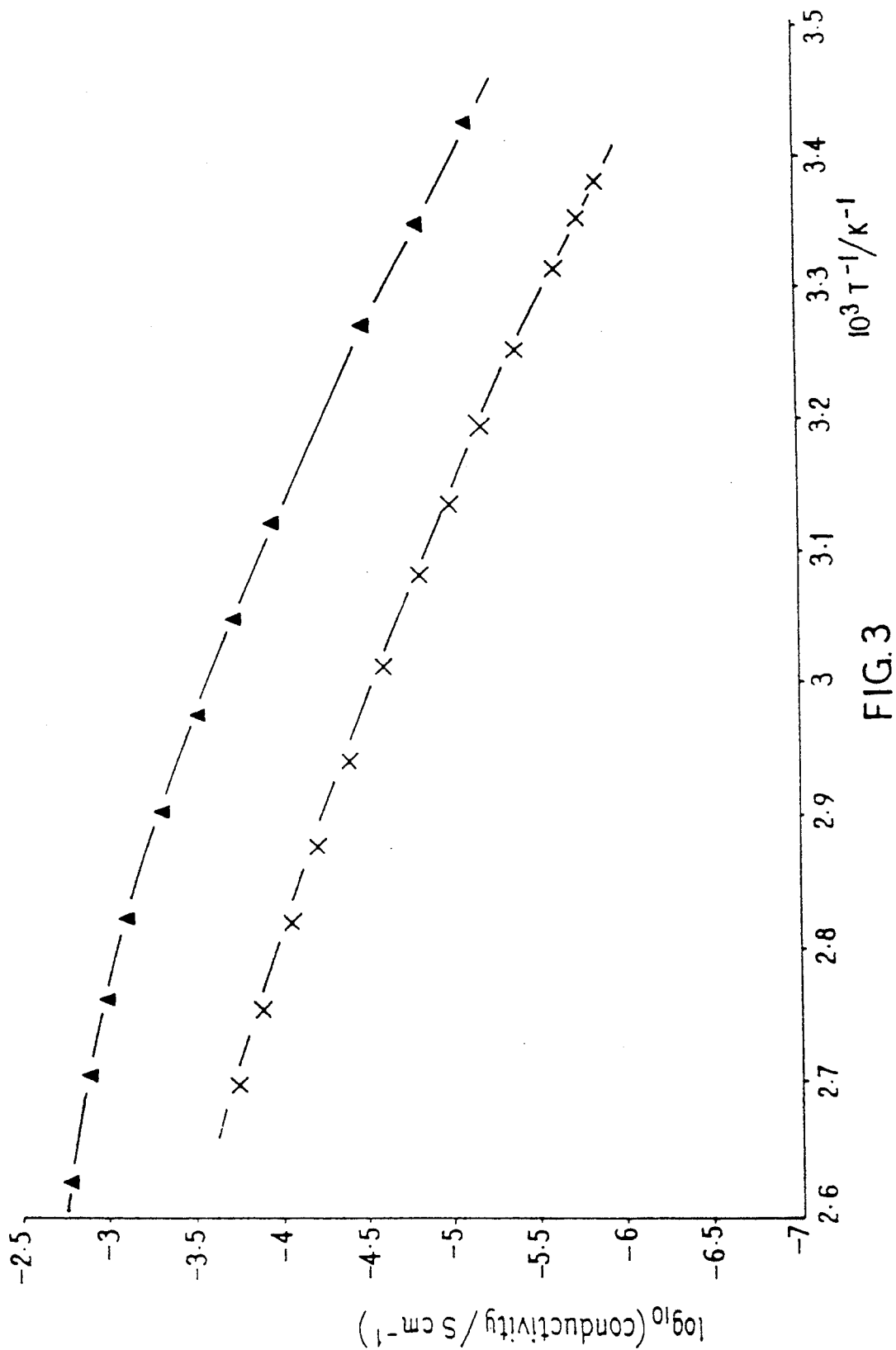
FIG. 3 is a graph showing the temperature dependence of the conductivity of $LiCF_3SO_3$-complexed ABA triblock polymers prepared in accordance with Example 4 using a solvent casting technique.
Figure 4:
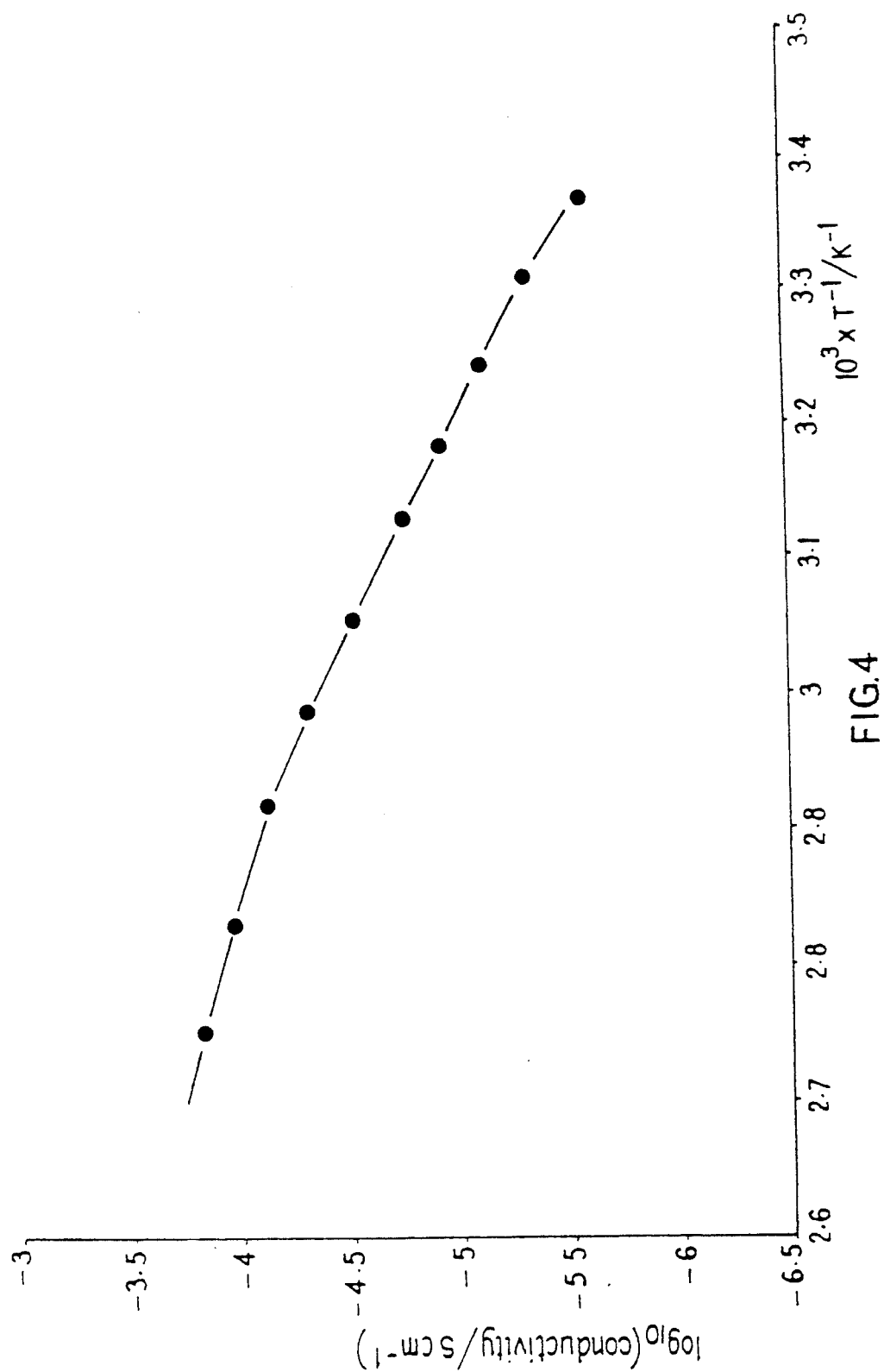
FIG. 4 is a graph showing the temperature dependence of the conductivity of $LiCF_3SO_3$-complexed ABA triblock polymers prepared in accordance with Example 5 in which there is 52% hydroxylation of the B component.
Figure 8:
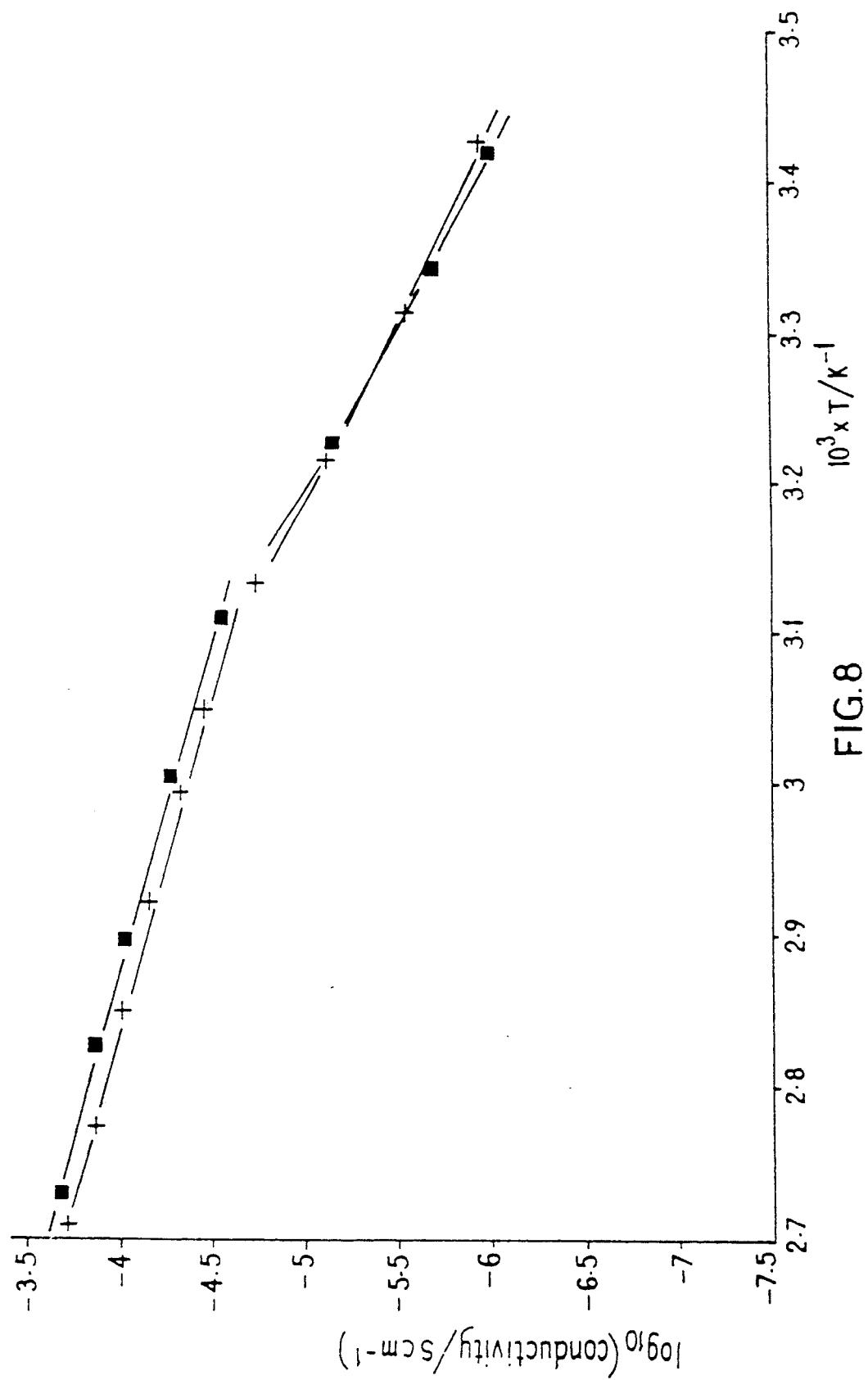
FIG. 8 is a graph showing the temperature dependence of the conductivity of $LiCF_3SO_3$-complexed ABA triblock polymers blended with high molar mass poly(ethylene oxide) in accordance with Example 11.

| Key to FIGS. 1-8 | | |
|---|---|---|
| FIG. 1. | O:Li = 7:1 = | ▲ |
| | O:Li = 16:1 = | X |
| | O:Li = 30:1 = | ● |
| | O:Li = 50:1 = | ■ |
| FIG. 2. | O:Li = 7:1 = | ▲ |
| | O:Li = 16:1 = | ● |
| | O:Li = 30:1 = | X |
| FIG. 3. | Pressed, O:Li = 7:1 = X | |
| | Cast from nitromethane, O:Li = 7:1 = ▲ | |
| FIG. 5. | Wt. % of ABA triblock polymer in polymer/polystyrene mixture | 64 = X <br> 50 = ● <br> 42 = ▲ |
| FIG. 8. | 25 wt. % poly(ethylene oxide) = ■ | |
| | 50 wt. % = + | |

We claim:

1. An ABA triblock polymer having a B/A block length ratio greater than 1, in which the A block material is a polymer selected from the group consisting of glassy polymers having a glass transition temperature above 70° C. and crystalline polymers having a softening or melting temperature above 70° C., and in which the B-block material is a polymer selected from the group consisting of elastomeric and amorphous polymers; wherein said B-block material incorporates attached side chains including oxyalkane sequences containing 2 to 6 carbon atoms between neighbouring oxygen atoms, which side chains serve to render the B-block material at least partially ion-coordinating due to the presence of oxygen in said oxyalkane sequences.

2. A polymer according to claim 1, wherein the oxyalkane sequence is a polyoxyethylene sequence —(—CH$_2$CH$_2$O—)$_m$— where m is 2 to 22.

3. A polymer according to claim 2, wherein the B-block material has a structure which is a cis-1,4-polybutadiene chain in which a proportion of the CH=CH unsaturated sites is replaced by:

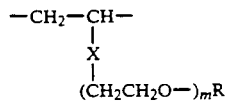

sites, where X is a linking group and R is hydrogen or C$_{1-6}$ alkyl, and the A-block material is selected from polystyrene, poly(a-methylstyrene), a polyurethane and poly(p-xylylene).

4. A polymer according to claim 3, wherein m is 7 to 17.

5. A polymer according to claim 3, wherein the polyoxyethylene sequences are linked to the B-block main chain via linking groups X which are or include ether links (—O—), methylene links (—CH$_2$—), ester links (—COO—), urethane links (—NHCOO—), or combinations of these.

6. A polymer according to claim 5, wherein the linking group X is an ether link (—O—) and R is methyl.

7. A polymer according to claim 5, wherein the linking group X is a urethane link OCONH(CH$_2$)$_n$NHCOO where n is 2 to 12 and R is methyl.

8. A polymer according to claim 7, wherein n is 6.

9. A polymer according to claim 5, wherein the linking group X is a dicarboxylate link OOC(CH$_2$)$_p$COO where p is 1 to 12 and R is methyl.

10. A polymer according to claim 9, wherein p is 2.

11. A polymer according to any one of claims 3 to 10, wherein the A-block material is polystyrene.

12. A polymer according to claim 11, wherein the average molar mass of the A-block segments is 10,000 to 40,000 each and of the B-block segment about 40,000 to 150,000.

13. A method for preparing a polymer as claimed in claim 1 which includes the steps of grafting poly oxyethylene sequences of structure —(CH$_2$CH$_2$O)$_m$—R where R is hydrogen or alkyl containing 1 to 6 carbon atoms and m is an integer in the range 2 to 22 as side chains onto the B-block of an ABA triblock polymer.

14. A method as claimed in claim 13, wherein the said ABA triblock polymer is a polystyrene-polybutadiene-polystyrene polymer.

15. A method for the separation of a solute from a solution, including the step of exposing the solution to an ABA triblock polymer so that the solute is partitioned between the ABA triblock polymer and the solvent, wherein the ABA triblock polymer has a B/A block length ratio greater than 1, and consists of A block material which is a polymer selected from the group consisting of glassy polymers having a glass transition temperature above 70° C. and crystalline polymers having a softening or melting temperature above 70° C., and B-block material which is a polymer selected from the group consisting of elastomeric and amorphous polymers, and wherein said B-block material incorporates attached side chains including oxyalkane sequences containing 2 to 6 carbon atoms between neighbouring oxygen atoms, the side chains serving to render the polymer at least partially ion-coordinating by virtue of the presence of oxygen in said oxyalkane sequences.

16. An ABA triblock polymer having a B/A block length ratio greater than 1, in which the A-block material is a polymer selected from the group consisting of polystyrene and poly(a-methylstyrene) and the B-block material is a cis-1,4-polybutadiene chain in which a proportion of the CH=CH unsaturated sites is replaced by:

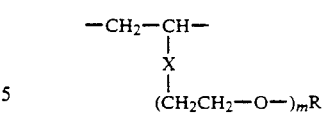

sites; wherein X is a linking group selected from the group consisting of ether links (—O—), methylene links (—CH$_2$—), ester links (—COO—), urethane links (—NHCOO—), or combinations of these; R is selected from the group consisting of hydrogen or C$_{1-6}$ alkyl, and m is from 2 to 22.

* * * * *

UNITED STATES PATENT AND TRADEMARK OFFICE
CERTIFICATE OF CORRECTION

PATENT NO. : 5,196,484

DATED : March 23, 1993

INVENTOR(S) : GILES et al

It is certified that error appears in the above-identified patent and that said Letters Patent is hereby corrected as shown below:

Cover Sheet, column 1, Item (30) insert the following:

--Oct. 27, 1987 PCT.........PCT/GB87/00759--

Signed and Sealed this

Fifteenth Day of February, 1994

Attest:

BRUCE LEHMAN

*Attesting Officer*  *Commissioner of Patents and Trademarks*